Patented Feb. 20, 1951

2,542,550

UNITED STATES PATENT OFFICE 2,542,550

ESTERS OF POLYETHER ACIDS AND PROCESS

John P. McDermott, Roselle, N. J., assignor to Standard Oil Development Company, a corporation of Delaware No Drawing. Application December 31, 1947, Serial No. 795,154

6 Claims. (Cl. 260—410.7)

This invention relates to new derivatives of hydroxy-aliphatic esters and particularly to synthetic products which may be employed as lubricants.

It has been found that if aliphatic esters of hydroxy-aliphatic carboxylic acids are reacted with alkylene oxides, new compounds are formed in which the hydroxyl group or groups of the esters are replaced by hydroxy-aliphatic ether groups. More specifically, the present invention relates to products formed by reacting aliphatic esters of open chain aliphatic carboxylic acids containing one to three carboxyl groups and one or more hydroxyl groups, the esterifying radical being any open chain aliphatic hydrocarbon group (which may contain one or more hydroxyl groups) with an alkylene oxide of the formula:

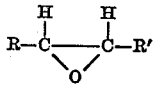

where R is hydrogen or an alkyl or an alkylene group containing not more than 6 carbon atoms, and R′ is hydrogen or a methyl group. Such products may be defined by the general formula—

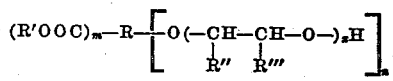

where R is an open chain aliphatic hydrocarbon group, R′ is an open chain aliphatic hydrocarbon group which may or may not contain one or more hydroxyl groups, R″ is hydrogen or an alkyl or alkylene group containing not more than 6 carbon atoms, R‴ is hydrogen or a methyl group, m is an integer from 1 to 3, n is an integer, x is an integer from 1 to 30. It will be understood that the value of x in the above formula is determined by the molecular ratio of the alkylene oxide to ester in the reaction. It is further to be understood that in some cases R′ may represent a radical which esterifies more than one carboxyl group, in one or more acid molecules as in glyceryl esters.

A typical reaction illustrating the present invention is the reaction of ethyl lactate with propylene oxide, conducted in the presence of stannic chloride as a catalyst. Any proportion of propylene oxide to the ester which is greater than 1 may be employed, and the reaction may be represented by the following equation:

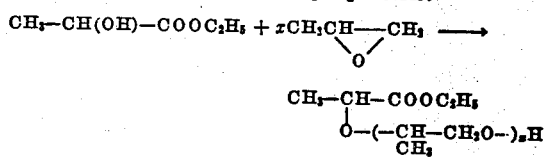

The hydroxy aliphatic acids from which the hydroxy esters employed in accordance with the present invention are derived may be any open chain aliphatic carboxylic acids containing one to three carboxyl groups, one or more hydroxyl group, and a hydrocarbon chain which may be saturated or unsaturated. Typical hydroxy acids falling within this group are glycollic acid, hydroxypropionic (hydracrylic) acid, hydroxybutyric acid, hydroxycaproic acid, lactic acid, malic acid, citric acid, hydroxystearic acid, ricinoleic acid, and the like.

The hydrocarbon groups which replace the hydrogen atoms of the acids to form the esters may be any open chain aliphatic hydrocarbon groups whether saturated or unsaturated, and they may contain hydroxyl groups, as in the glyceryl radical. Examples of such esterifying groups include ethyl, propyl, butyl, amyl, octyl, decyl, dodecyl, stearyl, wax-alkyl, oleyl, and similar radicals.

The alkylene oxides which are employed in accordance with the present invention have been defined above in a general formula. Typical examples of such oxides are ethylene oxide, propylene oxide, isopropyl ethylene oxide, isobutylene oxide, butadiene monoxide, and the like.

It has been found that many of the products prepared in accordance with the present invention are viscous liquids at ordinary atmospheric temperatures which are suitable for use as synthetic lubricants for the lubrication of machinery, textiles and the like. These products not only have viscosities which are within the range of lubricating oils, but they have particularly good viscosity indices. The products which are most suitable for use as lubricating oils are those derived from esters of hydroxy-fatty acids containing from 2 to 20 carbon atoms per molecule and having ester groups, whether alkyl or alkenyl, containing 1 to about 20 carbon atoms, more preferably 2 to 18 carbon atoms, and containing 1 to 4 hydroxyl groups, and in which the products have been formed by employing a molecular ratio of 10 to 26, more preferably 14 to 22, mols of alkylene oxide for each mol of ester. Such products may be modified by etherifying or esterifying the terminal hydroxyl group of the molecule, and such modified products are likewise suitable for use as lubricants.

The reaction of the alkylene oxide with the ester generally takes place instantaneously upon contact between the two reactants at normal temperatures, since the reaction is exothermic. In practice, the temperature of the reaction should be controlled by cooling means to prevent the same from rising substantially above the boiling point of the alkylene oxide employed. The reaction can be conducted, if desired, at a temperature somewhat lower than normal room temperature, that is, at temperatures down to about 10° C. Catalysts are generally required, and the Friedel-Crafts catalysts boron fluoride and stannic chloride have been found to be particularly suitable for these reactions. They are preferably employed in concentrations from 0.1 to 0.5 mol per mol of hydroxyl groups present in the esters.

In the following examples are exhibited in detail several embodiments of the process and products of the present invention; but it is to be understood that these examples are not to be considered as limiting the scope of the invention in any way.

*Example 1.—Ethyl lactate-propylene oxide reaction*

A solution of 13 g. (0.05 mol) of anhydrous SnCl₄ in 50 cc. of CHCl₃ was added to 59 g. (0.5 mol) of ethyl lactate contained in a 4-necked 3-liter flask equipped with a stirrer, a Dry Ice-isopropanol cooled reflux condenser, thermometer, and dropping funnel. 406 g. (7 mols) of propylene oxide was then added dropwise with rapid stirring over a period of two hours, the reaction temperature being maintained at 30° C. by means of an ice bath. The reaction mixture was then stirred for an additional 4 hours after which it was permitted to stand overnight.

The viscous product was then dissolved in 300 cc. of ether and washed with dilute HCl, distilled water, and dilute NaHCO₃ solution until the wash water was slightly alkaline. The ether solution was then dried over anhydrous K₂CO₃, followed by blowing with nitrogen on the steam bath to remove the ether. The clear, colorless viscous liquid product possessed the following characteristics:

Viscosity at 100° (Saybolt) =187.5 sec.
Viscosity at 210° (Saybolt) =47.8 sec.
Viscosity index=125.
Four point (ASTM) =<—35° F.
Flash point=385° F.

*Example 2.—Butyl malate-propylene oxide reaction*

To a stirred solution of 6.8 g. (0.1 mol) of BF₃ in 123 g. (0.5 mol) of n-butyl malate contained in the apparatus described in Example 1 was added 407 g. (7 mols) of propylene oxide over a period of 3 hours, the reaction temperature being maintained at 35–45° C. by means of an ice bath. After stirring for an additional hour, the product was diluted with 400 cc. of ether followed by washing with dilute NaHCO₃ and distilled water. The ether solution was dried overnight with anhydrous K₂CO₃. After removal of the ether and a small amount of low boiling material under vacuum, a clear, yellow viscous liquid was obtained which possessed the following characteristics:

Viscosity at 100° (Saybolt) =266.8 sec.
Viscosity at 210° (Saybolt) =53.8 sec.
Viscosity index=123.
Four point (ASTM) =<—35° F.
Flash point=390° F.

*Example 3.—Ethyl citrate-propylene oxide reaction*

This preparation was carried out in the same manner as that described in Example 2, using 138.1 g. (0.5 mol) of triethyl citrate, 6.8 g. (0.1 mol) of BF₃, and 464 g. (8 mols) of propylene oxide. A clear, yellow viscous liquid was obtained which possessed the following characteristics:

Viscosity at 100° (Saybolt) =281.1 sec.
Viscosity at 210° (Saybolt) =54.0 sec.
Viscosity index=117
Pour point (ASTM) =—30° F.
Flash point=340° F.

*Example 4.—Castor oil-propylene oxide reaction*

Using 140 g. (0.15 mol) of castor oil, 6.1 g. (0.1 mol) of BF₃, and 418 g. (7.2 mols) of propylene oxide, this preparation was carried out in the same manner as that described in Example 2, except that, prior to washing, the reaction product was diluted with 400 cc. of CHCl₃. A clear, yellow viscous liquid was obtained which possessed the following characteristics:

Viscosity at 100° (Saybolt) =1058.5 sec.
Viscosity at 210° (Saybolt) =133.5 sec.
Viscosity index=131
Pour point (ASTM) =—20° F.
Flash point=465° F.

I claim:

1. A process which comprises reacting about 14 molecular proportions of propylene oxide with 1 molecular proportion of ethyl lactate at approximately room temperature in the presence of about 0.1 molecular proportion of stannic chloride.

2. A process which comprises reacting about 14 molecular proportions of propylene oxide with 1 molecular proportion of di-n-butyl malate at about 35–45° C. in the presence of about 0.2 molecular proportion of boron fluoride.

3. The process which comprises reacting about 16 molecular proportions of propylene oxide with 1 molecular proportion of triethyl citrate at about 35–45° C. in the presence of about 0.2 molecular proportion of boron fluoride.

4. The process which comprises reacting 14 to 48 molecular proportions of propylene oxide with one molecular proportion of an aliphatic ester of a hydroxy fatty acid in the presence of a Friedel-Crafts type catalyst selected from the class consisting of boron fluoride and stannic chloride at a temperature from about —10° C. to about 35° C.

5. A process which comprises reacting about 48 molecular proportions of propylene oxide with one molecular proportion of castor oil at about 35–45° C. in the presence of about 0.1 molecular proportion of boron fluoride.

6. A composition of the formula:

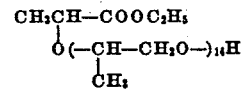

JOHN P. McDERMOTT.

REFERENCES CITED

The following references are of record in the file of this patent:

UNITED STATES PATENTS

| Number | Name | Date |
|---|---|---|
| 2,341,846 | Meincke | Feb. 15, 1944 |

FOREIGN PATENTS

| Number | Country | Date |
|---|---|---|
| 694,178 | Germany | July 27, 1940 |